United States Patent
Brown

(10) Patent No.: US 8,945,295 B2
(45) Date of Patent: Feb. 3, 2015

(54) BUILDING MATERIALS AND METHODS OF MANUFACTURE

(75) Inventor: Martin W. Brown, Gurnee, IL (US)

(73) Assignee: USG Interiors, LLC, Chicago, IL (US)

( * ) Notice: Subject to any disclaimer, the term of this patent is extended or adjusted under 35 U.S.C. 154(b) by 175 days.

(21) Appl. No.: 13/463,842

(22) Filed: May 4, 2012

(65) Prior Publication Data

US 2013/0291762 A1   Nov. 7, 2013

(51) Int. Cl.
| | | |
|---|---|---|
| C08L 1/00 | (2006.01) | |
| C08L 3/00 | (2006.01) | |
| C08L 5/00 | (2006.01) | |
| C09D 101/00 | (2006.01) | |
| C09D 103/00 | (2006.01) | |
| C09D 105/00 | (2006.01) | |
| C09J 101/00 | (2006.01) | |
| C09J 103/00 | (2006.01) | |
| C09J 105/00 | (2006.01) | |

(52) U.S. Cl.
USPC ................. 106/162.9; 106/162.1; 106/162.51

(58) Field of Classification Search
USPC ............................... 106/162.9, 162.1, 162.51
See application file for complete search history.

(56) References Cited

U.S. PATENT DOCUMENTS

| | | | | |
|---|---|---|---|---|
| 3,095,347 A | | 6/1963 | Becker | |
| 3,447,678 A | * | 6/1969 | Henry | 209/3 |
| 3,769,065 A | * | 10/1973 | Dunn | 264/122 |
| 3,847,633 A | | 11/1974 | Race | |
| 5,071,511 A | | 12/1991 | Pittman | |
| 5,174,819 A | * | 12/1992 | Carlson | 106/698 |
| 5,338,349 A | | 8/1994 | Farrar | |
| 5,911,818 A | | 6/1999 | Baig | |
| 5,964,934 A | | 10/1999 | Englert | |
| 6,443,256 B1 | * | 9/2002 | Baig | 181/286 |
| 2002/0096278 A1 | | 7/2002 | Foster et al. | |
| 2002/0139611 A1 | * | 10/2002 | Baig | 181/286 |
| 2003/0041987 A1 | | 3/2003 | Foster et al. | |
| 2006/0042515 A1 | * | 3/2006 | Bodycomb et al. | 106/698 |
| 2007/0186493 A1 | | 8/2007 | Baig | |
| 2009/0004459 A1 | | 1/2009 | Kipp et al. | |
| 2009/0130452 A1 | | 5/2009 | Surace et al. | |
| 2009/0173464 A1 | | 7/2009 | Baig | |
| 2012/0248655 A1 | * | 10/2012 | Francis | 264/330 |
| 2013/0145969 A1 | | 6/2013 | Surace et al. | |

FOREIGN PATENT DOCUMENTS

GB    1499804 A    2/1978

OTHER PUBLICATIONS

Notification of Transmittal of The International Search Report and The Written Opinion of the International Searching Authority, or the Declaration for PCT/US2013/0037552, filed Apr. 22, 2013, International Search Report dated Aug. 5, 2013, Written Opinion of the International Searching Authority.

Kakabadze, N.A.: "Perlite-asbestos composition for manufacturing heat-insulating articles", Chemical Abstracts, vol. 108, No. 14, 117893H, Apr. 4, 1988, p. 355, XP000158826, Georgian Scientific-Research Institute of Building Materials, ISSN: 009-2258 Abstract & SU 1359271 A1, Kompleksnyj Nii Str Materialov [SU] Dec. 15, 1987.

* cited by examiner

*Primary Examiner* — James McDonough

(74) *Attorney, Agent, or Firm* — Pearne & Gordon LLP

(57) ABSTRACT

An article of manufacture comprising a building panel such as ceiling tile for example includes, in addition to any by-product perlite fines, additional perlite fines in an amount sufficient to improve the fire resistance of the building panel over the fire resistance of the building panel without the additional perlite fines. In one aspect, the additional perlite fines can comprise at least approximately 3.5% perlite fines by weight. In another aspect, the additional perlite fines can have an average diameter of approximately 23 microns or less. Methods of manufacture related to the building panel also are disclosed.

2 Claims, 2 Drawing Sheets

BUILDING MATERIALS AND METHODS OF MANUFACTURE

BACKGROUND OF THE INVENTION

1. Field of the Invention

The present invention relates generally to the composition of panels employed as building materials in the construction of the surfaces of buildings and methods related to the manufacture of the panels. In particular, the present invention concerns the composition and manufacture of fire-resistant panels employed as ceiling tiles in ceiling suspension systems.

2. Discussion of the Prior Art

It is often the case that the walls and ceilings of buildings are constructed using pre-manufactured panels, such as: wallboard, including gypsum board for example; cement board including Durock® for example; and ceiling tile. The panels are self-supporting in that each panel is capable of supporting its own weight and retaining its shape without the assistance of reinforcing means or techniques. For example, in those instances in which the panels comprise ceiling tiles that are employed in a ceiling suspension system, the ceiling suspension system can comprise a system of metal or plastic members, referred to in the art as "tee" section elements, that are spaced apart in a grid-like arrangement that provides openings in which the ceiling tile can be suspended.

The composition or make-up of the pre-manufactured panels can vary widely. For example, the panels can comprise a base mat or core that includes, in varying amounts, one or more materials such as a gypsum-based material, mineral wool, fiberglass, cellulose fibers, clay, starch and perlite for example. In some instances, the panels can include a facing material, such as a vinyl material for example, attached to one or both sides of the base mat.

Typically, the perlite that is included in pre-manufactured panels comprises expanded perlite. Expanded perlite can be produced by subjecting ground perlite ore to an expansion operation wherein the ground perlite ore is expanded into coarse, medium and fine expanded perlite particles many times greater in size than the ground perlite ore from which the expanded perlite particles have been produced. The compositions of the panels, both with respect to the materials and the relative amounts of the materials the panels include, can be influenced by the properties it is intended that the panels possess. For example, panels that are intended to have special acoustical properties, typically, can be composed of materials and amounts thereof that are different from the materials and amounts of the materials that are included in panels whose acoustical properties are of no great concern. Similarly, the compositions of ceiling tiles that are to be installed in a high-humidity environment can be engineered to provide greater than normal resistance to the effects of moisture-laden air.

In certain instances, it can be important that the ceiling tiles be highly resistant to fire. Ceiling tile systems can be designed so as to form a membrane to prevent the fire from escaping through the ceiling and spreading. In order for the integrity of the membrane to be maintained, it is important that the ceiling tiles upon being exposed to the heat generated by a fire not sag or slump or be consumed to an extent that the ceiling tiles fall from the openings in the suspension system at which the tiles are supported. Special formulations can be employed in the manufacture of the ceiling tiles so as to prevent undue destruction of the tile when the tile is exposed to heat, including open flames.

BRIEF DESCRIPTION OF THE INVENTION

According to one aspect of the invention articles of manufacture comprising interior building panels, such as ceiling tiles for example, can include in addition to any by-product perlite fines (as defined hereafter) additional perlite fines in an amount sufficient to improve the fire resistance of the building panel without the additional perlite fines. In a particular embodiment of this aspect, the additional perlite fines can comprise at least 3.5% additional perlite fines by weight of the building panel.

According to another aspect, the building panels include by weight in addition to the additional perlite fines approximately 29.8% mineral wool, approximately 16.6% clay, approximately 32.6% coarse and medium expanded perlite, approximately 7.8% paper and approximately 7.8% starch.

According to a further aspect, the building panels include by weight in addition to the additional perlite fines approximately 30.0% mineral wool, approximately 21.0% clay, approximately 33.3% coarse and medium expanded perlite, approximately 6.0% paper and approximately 6.0% starch.

With respect to all of the foregoing aspects of the invention, particular embodiments thereof can include additional perlite fines in the amount by weight of at least approximately 3.5% and having an average diameter of approximately 23 microns or less. Also with respect to all of the foregoing aspects, the building panels can comprise ceiling tile.

According to still another aspect of the invention, a method is provided that includes heating perlite ore in an expansion furnace to produce coarse and medium expanded perlite particles, more commonly referred to simply as coarse and medium expanded perlite, and fine expanded perlite particles, referred to herein as by-product perlite fines. The coarse and medium expanded perlite and the by-product perlite fines are pneumatically transported to a separator at which the coarse and medium expanded perlite is separated from the by-product perlite fines. The by-product perlite fines from which the coarse and medium perlite has been separated are pneumatically transported past the separator to a collection device at which the by-product perlite fines are collected. A selected portion of the by-product perlite fines collected at the collection device is removed from the collection device. The selected portion of the by-product perlite fines removed can comprise up to the entirety of the by-product perlite fines collected at the collection device. The coarse and medium expanded perlite separated from the by-product perlite fines at the separator are recombined with any by-product perlite fines collected at the collection device that are not included with the selected portion of the by-product perlite fines removed from the collection device. The recombined coarse and medium expanded perlite and by-product perlite fines are applied to machinery for the manufacture of building panels such as machinery for manufacturing ceiling tiles.

According to still a further aspect of the invention, a method is provided that includes heating perlite ore in an expansion furnace to produce coarse and medium expanded perlite and by-product perlite fines. The coarse and medium expanded perlite and the by-product perlite fines are pneumatically transported to a separator at which the coarse and medium expanded perlite is separated from the by-product perlite fines. The by-product perlite fines from which the coarse and medium expanded perlite has been separated are pneumatically transported past the separator to a collection device at which the perlite fines are collected. The coarse and medium expanded perlite separated from the by-product perlite fines at the separator is recombined with essentially the entirety of the by-product perlite fines collected at the collection device and additional perlite fines are added to the recombined coarse and medium expanded perlite and by-product perlite fines. The recombined coarse and medium expanded perlite and by-product perlite fines to which the additional perlite fines have been added are applied to machinery for the manufacture of building panels such as machinery for manufacturing ceiling tiles. In a particular embodiment of this aspect, the additional perlite fines can comprise by-product perlite fines that are collected at the collection device and included in the selected portion of the by-product perlite fines removed from the collection device in the method described in the immediately preceding paragraph.

BRIEF DESCRIPTION OF THE DRAWINGS

The foregoing and other aspects of the invention will be apparent to those skilled in the art to which the present invention relates from the detailed descriptions of examples of aspects and embodiments of the invention that follow with reference to the accompanying drawings in which.

DESCRIPTIONS OF EXAMPLES OF EMBODIMENTS OF THE INVENTION

Examples of embodiments that incorporate one or more aspects of the present invention are described below with references, in some cases, to the accompanying drawings. These examples are not intended to be limitations on the present invention. Thus, for example, in some instances, one or more examples of the present invention described with reference to one aspect or embodiment can be utilized in other aspects and embodiments. In addition, certain terminology is used herein for convenience only and is not to be taken as limiting the present invention.

Concerning the reference herein to "coarse and medium expanded perlite" and "perlite fines" it is noted that individuals skilled in the building materials arts in which expanded perlite is used are familiar with the usual classification of expanded perlite into the three categories: "coarse;" "medium;" and "fine". And while there are no hard and fast dimensional parameters established in the building materials arts for classifying expanded perlite, individuals skilled in the building materials arts are familiar with the basic characteristics of expanded perlite that cause the expanded perlite to be classified in one of these three categories. Consequently, the designations "coarse and medium expanded perlite" and "perlite fines" as used in the specification and in the claims are intended to be inclusive of expanded perlite that those skilled in the building materials arts would deem to comprise expanded perlite that is appropriately included in the "coarse," "medium" and "fine" categories, respectively, that are applied to expanded perlite.

Figure 1:
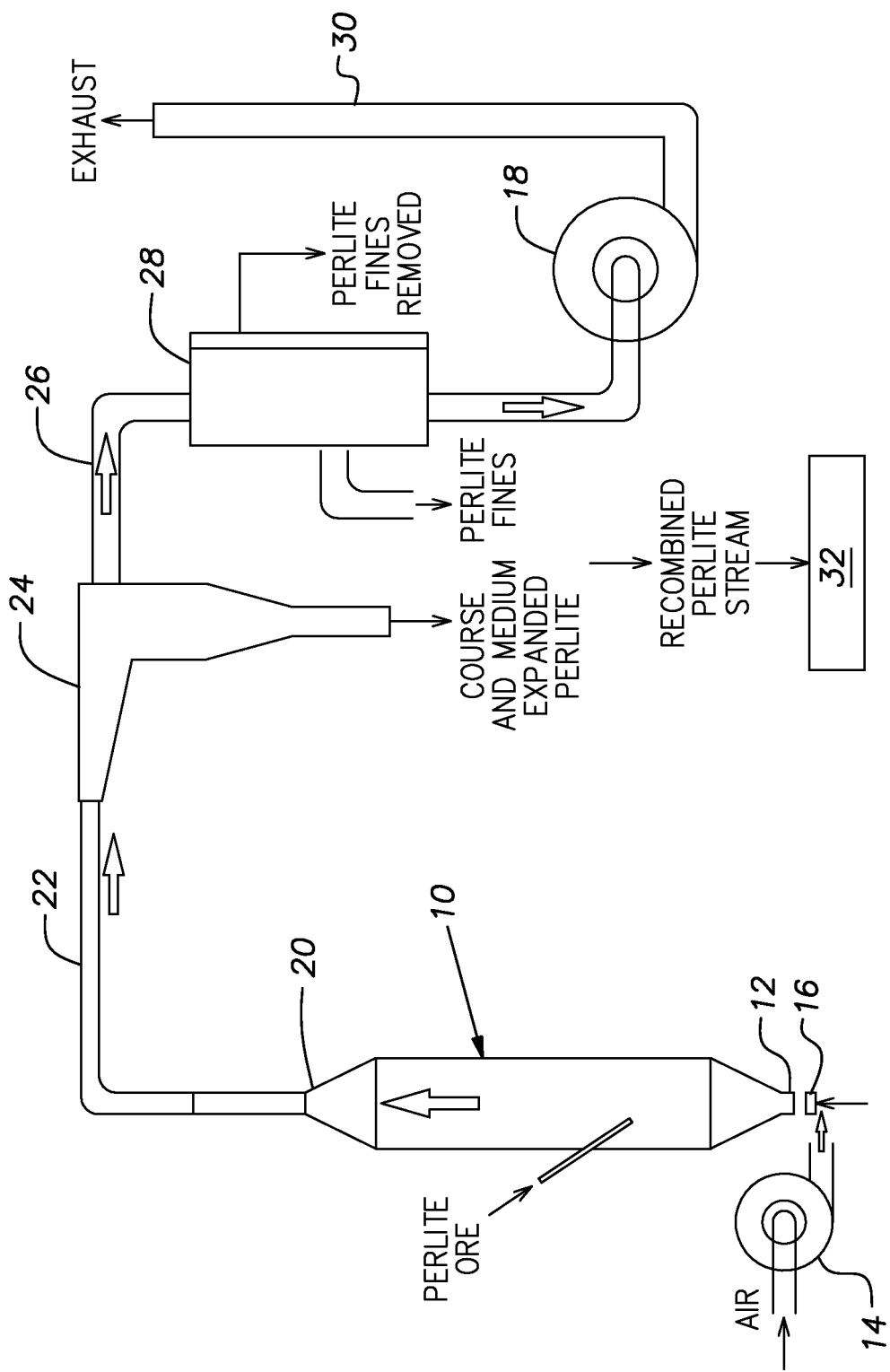
FIG. 1 comprises a schematic representation of an example of a perlite expansion operation and examples of methods of dealing with perlite fines produced in such an operation.

An aspect of the present invention concerns the incorporation of perlite fines into building panels such as wallboard and ceiling tile for example for the purpose of improving the fire resistance of the building panels. One source of the perlite fines can comprise a process for manufacturing expanded perlite from perlite ore as illustrated in FIG. 1. As shown in FIG. 1, processed perlite ore is fed directly to an expansion furnace 10 in which the perlite ore is heated to approximately 1,400° to 1,800° Fahrenheit and the entrapped combined water in the ore released as steam. The releasing of the steam causes the perlite ore to expand greatly and form coarse and medium expanded perlite and perlite fines. The perlite ore can be heated by hot air that is injected at the entry end 12 of the expansion furnace, and the hot air can be created by passing ambient air through a fan 14 and past a natural gas burner 16 into the entry end 12 of the expansion furnace 10. Alternately, the perlite ore can be preheated before it is introduced into the expansion furnace 10 as well as being heated by the hot air that is injected at the entry end 12 of the expansion furnace.

The hot air in the expansion furnace 10, under the influence of the fan 14 and a suction fan 18 is drawn from the expansion furnace 10 through the exit end 20 of the expansion furnace and the hot air carries with it the coarse and medium expanded perlite and the perlite fines produced in the expansion furnace 10. The coarse and medium expanded perlite and the perlite fines in the hot air are transported through the conduit 22 to a cyclone separator 24 where the coarse and medium expanded perlite is essentially entirely separated from the perlite fines. During this transportation operation, additional perlite fines can be generated as a result of the breakdown of some of the coarse and/or medium expanded perlite. In any event, the perlite fines that remain in the hot air following the separation therefrom of the coarse and medium expanded perlite pass through perlite fines conduit 26 into a baghouse 28 where the perlite fines are collected. Ambient air can be allowed to infiltrate the hot air stream as it passes to the baghouse to cool the hot air stream, and the resultant cooled air stream is exhausted from the baghouse 28 to the atmosphere past suction fan 18 and through exhaust conduit 30 for example.

The primary purpose of manufacturing expanded perlite as has been described with reference to FIG. 1 is to produce coarse and medium expanded perlite, the incorporation of which into building panels is known to impart certain beneficial properties to the panels as understood by those having ordinary skill in the art. The perlite fines that are produced along with the coarse and medium expanded perlite are considered to be essentially a by-product of the production of the coarse and medium expanded perlite. In a typical mode of operation of the manufacturing process as shown in FIG. 1, the perlite fines collected at the baghouse 28 are recombined with the coarse and medium expanded perlite separated from the perlite fines at the cyclone separator 24 and the recombined expanded perlite stream is delivered to the machinery 32 for manufacturing ceiling tile. The primary purpose of first separating the coarse and medium expanded perlite from the perlite fines at the cyclone separator 24, followed by collecting the perlite fines at the baghouse 28 and thereafter recombining the coarse and medium expanded perlite with the perlite fines is because the combustion air must be separated from the solid mass or bulk of the expanded perlite.

According to an aspect of the invention, rather than recombining the perlite fines with the coarse and medium expanded perlite, a selected portion of the perlite fines collected at the baghouse 28, up to the entire amount of the perlite fines collected at the baghouse, can be removed from the baghouse, as indicated in FIG. 1. The perlite fines removed in this way can then be added to other materials used in the manufacture of building panels in amounts sufficient to provide building panels having improved fire-resistant qualities. In this connection, according to an example of this aspect of the invention, perlite fines collected at the baghouse 28 during an initial stage of operation of the expansion furnace 10 and removed from the baghouse can be added to a recombined stream of coarse and medium expanded perlite and perlite fines produced during a later stage of operation of the furnace when all the perlite fines collected at the baghouse 28 are recombined with the coarse and medium expanded perlite. A sufficient amount of the additional perlite fines can be added so as to increase the perlite fines content delivered to the machinery 32 to a value that will impart improved fire-resistant properties to the building panels made at the machinery 32. Perlite fines produced and collected in accordance with the process illustrated in FIG. 1 typically have an average diameter of about 23 microns or less and perlite fines of that size have been found to be effective in producing improved fire-resistant qualities in building panels.

The additional perlite fines can be sourced in other ways. For example, coarse and medium expanded perlite can be ground or otherwise finely divided to produce perlite fines than can be used as the additional perlite fines added to a building panel to improve its fire resistance.

In accordance with another aspect of the invention, it has been determined that the removal of some or all of the perlite fines collected at the baghouse 28 rather than their recombination into a single stream with the coarse and medium expanded perlite separated at the cyclone separator 24 can enhance the productivity of the machinery 32. Thus, there can be a two-fold benefit realized from removing some or all of the perlite fines from the baghouse 28. Specifically, as described, the perlite fines removed from the baghouse 28 can be added in sufficient amounts to compositions applied to the manufacture of building panels to improve the fire resistance of the building panels that are manufactured. And, in addition, at least in instances in which the fire resistance of the building panels is of no significant concern or is dealt with by other means, the amount of the perlite fines delivered to the machinery 32 can be reduced so that the efficiency of the machinery can be enhanced.

The improvement in fire-resistant properties that building panels, and particularly ceiling tiles, can experience as a result of the incorporation of effective amounts of perlite fines into the building panels has been demonstrated. Specifically, two types of ceiling tile samples were subjected to a high temperature testing environment for the purpose of evaluating their respective responses to the high temperature testing environment. One type of samples included perlite fines only in amounts as are typically present as a by-product in the manufacture of expanded perlite by a process similar to the process of FIG. 1 in which the perlite fines collected at the baghouse 28 are recombined with the coarse and medium expanded perlite initially separated from the perlite fines at the cyclone 24 and the recombined coarse and medium expanded perlite and the perlite fines directed to the machinery 32. The other type of ceiling tile samples tested included perlite fines in addition to the perlite fines that are typically present as a by-product in the manufacture of expanded perlite by a process similar to the process of FIG. 1 in which the perlite fines collected at the baghouse 28 are recombined with the coarse and medium expanded perlite. The testing environment comprised a test furnace, the interior temperature of which was maintained at approximately 1,500° Fahrenheit during the time of the tests.

As used in the specification and claims, the expression "by-product perlite fines" refers to perlite fines that are produced as a by-product of a perlite ore expansion operation such as described with reference to FIG. 1 for example.

The testing procedure employed in evaluating the ceiling tile samples comprised placing each ceiling tile sample in the test furnace and supporting each sample at its opposite ends along its length above the bottom surface of the test furnace. This arrangement allowed each sample to sag or slump downwardly essentially at its midpoint as the sample reacted to the imposition of the high temperature in the test furnace.

The testing procedure involved the testing a plurality of ceiling tile samples, each of which was identified as being assigned to a "Trial #1", "Trial #2" or "Trial #3" category depending on the composition of the tile. The compositions of the samples for these three trials were as indicated in the following table:

| Constituent | Trial #1 (Weight Percent) | Trial #2 (Weight Percent) | Trial #3 (Weight Percent) |
|---|---|---|---|
| Mineral Wool | 30.03 | 29.81 | 30.01 |
| Clay | 17.01 | 16.63 | 21.00 |
| Coarse and Medium Expanded Perlite | 36.94 | 32.58 | 33.30 |
| Perlite Fines | 0.00 | 3.62 | 3.68 |
| Paper | 8.01 | 7.82 | 6.00 |
| Starch | 8.01 | 7.82 | 6.00 |
| Miscellaneous | — | 1.72 | — |

From the foregoing table, it can be seen that the samples included in Trial #1 represent building panels comprising ceiling tiles that included by weight approximately 30.0% mineral wool, approximately 17.0% clay, approximately 36.9% coarse and medium expanded perlite, approximately 8.0% paper and approximately 8.0% starch. The indication in the table that the samples of Trial #1 contained 0.00% by weight of perlite fines represents the fact that the samples included in Trial #1 did not include any perlite fines other than the by-product perlite fines that were present as a result of the recombination of the coarse and medium expanded perlite and the by-product perlite fines produced during the production of the coarse and medium expanded perlite in a process such as described with reference to FIG. 1 for example. The samples included in Trial #2 represent building panels comprising ceiling tiles that included by weight approximately 29.8% mineral wool, approximately 16.6% clay, approximately 32.6% coarse and medium expanded perlite, approximately 3.6% perlite fines in addition to the by-product perlite fines that were present as a result of the recombination of the coarse and medium expanded perlite and the by-product perlite fines produced during the production of the coarse and medium expanded perlite in a process such as described with reference to FIG. 1 for example, approximately 7.8% paper and approximately 7.8% starch. The samples included in Trial #3 represent building panels comprising ceiling tiles that included by weight approximately 30.0% mineral wool, approximately 21.0% clay, approximately 33.3% coarse and medium expanded perlite, approximately 3.7% perlite fines in addition to the by-product perlite fines that were present as a result of the recombination of the coarse and medium expanded perlite and the by-product perlite fines produced during the production of the coarse and medium expanded perlite in a process such as described with reference to FIG. 1 for example, approximately 6% paper and approximately 6% starch.

Figure 2:
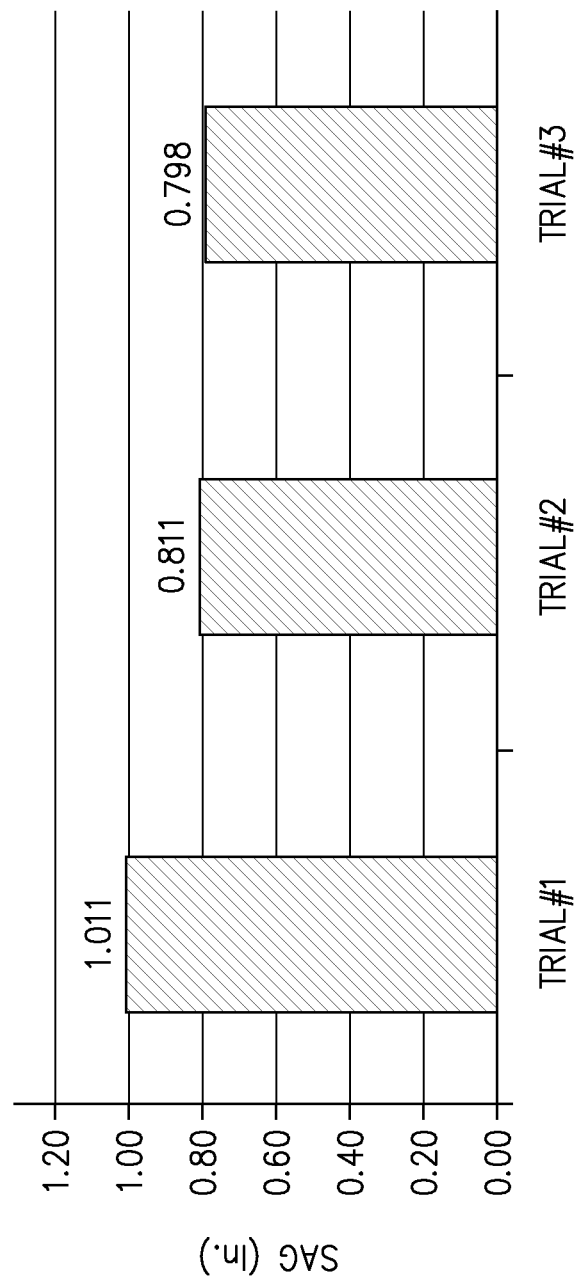
FIG. 2 comprises a graph that provides a comparison of the fire-resistant properties of ceiling tiles that include perlite fines in particular amounts sufficient to improve the fire-resistant properties of the ceiling tiles with ceiling tiles including less than those particular amounts of perlite fines.

Following the completion of the testing procedure for each sample, the extent to which the sample had sagged during the test was determined. That is, the distance the midpoint of the sample had sagged below the position at which the midpoint was originally located at the outset of the test was observed and recorded. An average sag value was calculated for each of the Trial #1 samples, the Trial #2 samples and the Trial #3 samples by adding together the sag values for all the samples included in each trial and dividing that total sag value by the number of samples that were tested. The results of the measurements made in this regard are shown in the graph of FIG. 2. From FIG. 2, it can be seen that the samples of Trial #1, which contained only by-product perlite fines that were present as a result of the recombination of the coarse and medium expanded perlite and the by-product perlite fines produced during the production of the coarse and medium expanded perlite in a process such as described with reference to FIG. 1 for example, sagged an average of 1.011 inches; the samples of Trial #2, which contained approximately 3.6% by weight of perlite fines in addition to the by-product perlite fines that were present as a result of the recombination of the coarse and medium expanded perlite and the by-product perlite fines produced during the production of the coarse and medium expanded perlite in a process such as described with reference to FIG. 1 for example, sagged an average of 0.811 inches; and the samples of Trial #3, which contained approximately 3.7% by weight of perlite fines in addition to the by-product perlite fines that were present as a result of the recombination of the coarse and medium expanded perlite and the by-product perlite fines produced during the production of the coarse and medium expanded perlite in a process such as described with reference to FIG. 1 for example, sagged an average of 0.798 inches. The samples of Trial #3, in addition to including perlite fines in addition to the by-product perlite fines, also included increased amounts of clay that could have contributed to the improved sag performance in the samples of Trial #3 as compared to the samples of Trial #2. Thus, it can be seen that the fire resistant qualities of the samples of Trial #2 and Trial #3 were substantially improved over those of the samples of Trial #1. More specifically, the incorporation in the ceiling tile of perlite fines in an amount of at least approximately 3.5% in addition to the by-product perlite fines present has been found to produce the type of improved fire resistance in the ceiling tile that is considered desirable.

From the foregoing description, it will be understood that the present invention in one aspect provides a method comprising the following steps: heating perlite ore in an expansion furnace, such as expansion furnace 10 for example, to produce coarse and medium expanded perlite and by-product perlite fines; pneumatically transporting the coarse and medium expanded perlite and by-product perlite fines to a separator, such as the cyclone 24 for example, at which the coarse and medium expanded perlite is separated from the by-product perlite fines; pneumatically transporting the by-product perlite fines from which the coarse and medium perlite has been separated past the separator to a collection device, such as the baghouse 28 for example, at which the by-product perlite fines are collected; removing a selected portion of the by-product perlite fines from the collection device, the selected portion of the by-product perlite fines removed comprising up to the entirety of the by-product perlite fines collected at the collection device; recombining the coarse and medium expanded perlite separated at the separator with any by-product perlite fines collected at the collection device and not included with the selected portion of the by-product perlite fines removed from the collection device; and applying the recombined coarse and medium expanded perlite and by-product perlite fines to machinery, such as the machinery 32 for the manufacture of building panels such as ceiling tiles for example.

It also will be understood from the foregoing description that the present invention in another aspect provides a method comprising the following steps: heating perlite ore in an expansion furnace, such as the expansion furnace 10 for example, to produce coarse and medium expanded perlite and by-product perlite fines; pneumatically transporting the coarse and medium expanded perlite and by-product perlite fines to a separator, such as the cyclone 24 for example, at which the coarse and medium expanded perlite is separated from the by-product perlite fines; pneumatically transporting the by-product perlite fines from which the coarse and medium expanded perlite has been separated past the separator to a collection device, such as the baghouse 28 for example, at which the by-product perlite fines are collected; recombining the coarse and medium expanded perlite separated at the separator with essentially the entirety of the by-product perlite fines collected at the collection device; adding to the recombined coarse and medium expanded perlite and by-product perlite fines additional perlite fines; and applying to machinery, such as the machinery 32 for example, for the manufacture of building panels, such as ceiling tile for example, the recombined coarse and medium expanded perlite and by-product perlite fines to which the additional perlite fines have been added. In a particular embodiment of this aspect, the additional perlite fines can comprise by-product perlite fines previously collected at the collection device and included in the selected portion of the by-product perlite fines removed from the collection device at an earlier time as described in the previous paragraph.

While the present invention has been described above and illustrated with reference to certain embodiments thereof, it is to be understood that the invention is not so limited. In addition, modifications and alterations of the aspects of the invention described herein will occur to those skilled in the art upon reading and understanding the specification, including the drawings. The present invention is intended to cover and include any and all such modifications and variations to the described embodiments that are encompassed by the following claims.

What is claimed is:

1. A method comprising:
heating perlite ore in an expansion furnace to produce coarse and medium expanded perlite and by-product perlite fines;
pneumatically transporting the coarse and medium expanded perlite and by-product perlite fines to a separator at which the coarse and medium expanded perlite is separated from the by-product perlite fines;
pneumatically transporting the by-product perlite fines from which the coarse and medium expanded perlite has been separated past the separator to a collection device at which the by-product perlite fines are collected;
recombining the coarse and medium expanded perlite separated at the separator with essentially the entirety of the by-product perlite fines collected at the collection device;
adding additional perlite fines to the recombined coarse and medium expanded perlite and by-product perlite fines; and
applying to machinery for the manufacture of ceiling tile the recombined coarse and medium expanded perlite and by-product perlite fines to which the additional perlite fines have been added, mineral wool, starch and essentially no cement, the total perlite on a weight basis not exceeding the perlite weight content ordinarily used in a conventional formulation using only coarse and medium expanded perlite and bi-product fines to product ceiling tile that is sag resistant when exposed to a fire.

2. The method of claim 1, wherein the additional perlite fines are proportioned by weight to about 1/9 of the recombined coarse and medium expanded perlite and by-product perlite fines.

* * * * *